(12) United States Patent
Shah (10) Patent No.: US 7,611,463 B2
(45) Date of Patent: Nov. 3, 2009

(54) ULTRASOUND BEAMFORMER WITH HIGH SPEED SERIAL CONTROL BUS PACKETIZED PROTOCOL

(75) Inventor: Snehal Chandrakant Shah, Milwaukee, WI (US)

(73) Assignee: General Electric Company, Schenectady, NY (US)

( * ) Notice: Subject to any disclaimer, the term of this patent is extended or adjusted under 35 U.S.C. 154(b) by 521 days.

(21) Appl. No.: 10/975,579

(22) Filed: Oct. 28, 2004

(65) Prior Publication Data

US 2006/0092930 A1   May 4, 2006

(51) Int. Cl.
*A61B 8/00* (2006.01)
(52) U.S. Cl. .................................. 600/437
(58) Field of Classification Search ............... 711/200; 600/437; 370/230, 389
See application file for complete search history.

(56) References Cited

U.S. PATENT DOCUMENTS

| | | | |
|---|---|---|---|
| 5,053,947 A * | 10/1991 | Heibel et al. ............. 709/237 |
| 5,369,624 A | 11/1994 | Fukukita et al. |
| 5,388,079 A | 2/1995 | Kim et al. |
| 5,469,851 A | 11/1995 | Lipschutz |
| 5,544,128 A | 8/1996 | Kim et al. |
| 5,795,297 A | 8/1998 | Daigle |
| 5,964,835 A * | 10/1999 | Fowler et al. ............. 709/216 |
| 5,971,923 A * | 10/1999 | Finger ........................ 600/437 |
| 6,111,816 A * | 8/2000 | Chiang et al. ............... 367/7 |
| 6,262,749 B1 | 7/2001 | Finger et al. |
| 6,300,961 B1 | 10/2001 | Finger et al. |
| 6,358,204 B1 | 3/2002 | Finger et al. |
| 6,379,304 B1 | 4/2002 | Gilbert et al. |
| 6,417,857 B2 | 7/2002 | Finger et al. |
| 6,421,731 B1 * | 7/2002 | Ciotti et al. ............... 709/238 |
| 6,497,664 B1 | 12/2002 | Randall et al. |
| 6,524,254 B2 | 2/2003 | Erikson |
| 6,530,887 B1 | 3/2003 | Gilbert et al. |
| 6,547,730 B1 | 4/2003 | Lin et al. |
| 6,556,695 B1 | 4/2003 | Packer et al. |
| 6,561,979 B1 | 5/2003 | Wood et al. |
| 6,595,921 B1 | 7/2003 | Urbano et al. |
| 6,629,926 B1 | 10/2003 | Finger et al. |
| 6,666,825 B2 | 12/2003 | Smith et al. |
| 6,669,633 B2 | 12/2003 | Brodsky et al. |
| 6,695,783 B2 | 2/2004 | Henderson et al. |
| 6,701,341 B1 | 3/2004 | Wu et al. |
| 6,716,189 B1 | 4/2004 | Jarvik et al. |

(Continued)

OTHER PUBLICATIONS

US Patent Application, Ultrasound Beamformer With Scalable Receiver Boards, filed Jan. 11, 2005, U.S. Appl. No. 11/033,188, (21) pages.

(Continued)

*Primary Examiner*—Eric F Winakur
*Assistant Examiner*—Katherine L Fernandez
(74) *Attorney, Agent, or Firm*—The Small Patent Law Group; Dean D. Small (57) ABSTRACT

A method for conveying control information in an ultrasound system is provided. The method provides unique identifiers for the processing components in a beamformer of an ultrasound system. The method formats control information into at least one packet based on a packetized protocol, the control information relating to beamforming operations carried out by the processing components. The method conveys the control information to the processing components.

10 Claims, 5 Drawing Sheets

U.S. PATENT DOCUMENTS

| | | | |
|---|---|---|---|
| 6,752,763 | B2 | 6/2004 | Erikson |
| 6,780,154 | B2 | 8/2004 | Hunt et al. |
| 6,783,493 | B2 | 8/2004 | Chiang et al. |
| 6,822,374 | B1 | 11/2004 | Smith et al. |
| 6,869,401 | B2 | 3/2005 | Gilbert et al. |
| 7,058,054 | B2 * | 6/2006 | Abdollahi et al. ............ 370/392 |
| 2001/0035866 | A1 | 11/2001 | Finger et al. |
| 2002/0067359 | A1 | 6/2002 | Brodsky et al. |
| 2002/0120193 | A1 | 8/2002 | Chiang et al. |
| 2003/0073894 | A1 * | 4/2003 | Chiang et al. ............... 600/407 |
| 2003/0100833 | A1 | 5/2003 | He et al. |
| 2003/0103387 | A1 * | 6/2003 | Bondurant ............. 365/189.05 |
| 2003/0176787 | A1 | 9/2003 | Gilbert et al. |
| 2004/0015079 | A1 | 1/2004 | Berger et al. |
| 2006/0092930 | A1 | 5/2006 | Shah |

OTHER PUBLICATIONS

US Patent Application, Method and Apparatus for Utilizing a High Speed Serial Data Bus Interface Within an Ultrasound System, filed Jul. 14, 2005, U.S. Appl. No. 11/181,343, (17) pages.

* cited by examiner

ULTRASOUND BEAMFORMER WITH HIGH SPEED SERIAL CONTROL BUS PACKETIZED PROTOCOL

BACKGROUND OF THE INVENTION

The invention relates generally to various aspects of a beamformer (BF) for an ultrasound system.

In conventional ultrasound systems, a variety of beamformer (BF) designs have been proposed to perform the functions of the beamformer associated with the signals transmitted to and received from transducer elements of an ultrasound probe. The beamformer performs signal processing on a matrix of input signals received from a number of the transducer elements in the probe. The transducer elements transmit (fire) ultrasound pulses to scan a region of interest and generate input signals when the transducer elements receive ultrasound echoes from the region of interest in response to the ultrasound scan. Conventional beamformers combine at least subsets of the matrix of input signals to form one or more BF receive beams. The input signal received from each transducer is referred to as a transducer channel and multiple transducer channels are combined to form a receive beam or line. Conventional probes may offer 64 or 128 or 256 transducer channels. The beamformer includes components that control transmission and reception by each transducer element. The beamformer uses predetermined sets of delays to form each transmit beam and receive beam.

The beamformer components are designed to use a different set of delays with the same set of input channels or input signals to obtain or form multiple receive beams. The multiple receive beams are associated with the ultrasound echoes from focal points along multiple scan lines for a given ultrasound pulse. The signals received from multiple transducer elements may be processed simultaneously into multiple receive beams. The collection and processing of echo information along multiple scan lines simultaneously within the subject is referred to as multi-line acquisition (MLA). Heretofore, limited communications capabilities existed between the distributed processing within the beamformer and the central control of the beamformer. Existing systems experienced limitations in the amount and type of control information that could be processed by the electronics within the beamformer.

A need exists for an improved communications and control link between the distributed processing of individual channels in the beamformer and the beamformer controller.

BRIEF DESCRIPTION OF THE INVENTION

A method for conveying control information in an ultrasound system is provided. The method provides unique identifiers for the processing components in a beamformer of an ultrasound system. The method formats control information into at least one packet based on a packetized protocol, the control information relating to beamforming operations carried out by the processing components. The method conveys the control information to the processing components.

The method provides for transmission of control information at a rate of at least 400 Mbps (megabits per second). Transmission of control information is provided between multiple processing components interconnected by a component-to-component bus on at least two separate circuit boards.

The formatting provided includes formatting of the control information into distinct address and data packet formats. The formatting includes formatting of a device ID field containing an ID uniquely identifying one of the processing components, and formatting an address field containing an address into memory associated with one of the processing components, the address being correlated to at least one beamforming parameter.

The method further comprises conveying at least one packet from the processing components, wherein the packet includes an error field and an acknowledgment field. The error field is set to indicate a failed transaction by an associated one of the processing components. The acknowledgement field is set to indicate receipt by an associated one of the processing components.

Formatting also includes formatting a read/write field containing a read/write instruction directing an associated one of the processing components to read/write information from/to an address in memory associated with one of the processing components. Each of the processing components provide one of a transmit and receive beamformer operation.

A protocol for formatting control information is provided for conveying the formatted control information to a processing component of a beamformer within an ultrasound system. The processing component has a unique identifier. The protocol provides for an address packet formatted in accordance with a packetized protocol, the address packet containing control information associated with the processing component to which the control information is directed. The protocol further provides a data packet formatted to contain control information related to beamforming operations carried out by an associated one of the processing components. The address packet is configured to be transmitted between multiple processing components interconnected by a component-to-component bus, and to be transmitted between multiple processing components arranged on at least two separate circuit boards.

The data packet is associated with the address packet, the address packet identifies at least one processing component to which the control information is directed. The data packet contains at least a portion of the control information.

The address packet includes several fields such as a device field containing an ID that uniquely identifies one of the processing components and an address field containing an address for a location in memory associated with at least one of the processing components. The address is correlated to a beamforming parameter. An acknowledgement field is configured to be set by an associated processing component to indicate receipt of the address packet by the associated processing component. A read/write field containing a read/write instruction is configured to direct an associated one of the processing components to read/write information from/to an address in memory associated with one of the processing components.

The address packet contains control information directed to a processing component that is configured to perform one of transmit or receive beamforming operations. or both.

DETAILED DESCRIPTION OF THE INVENTION

Figure 1:
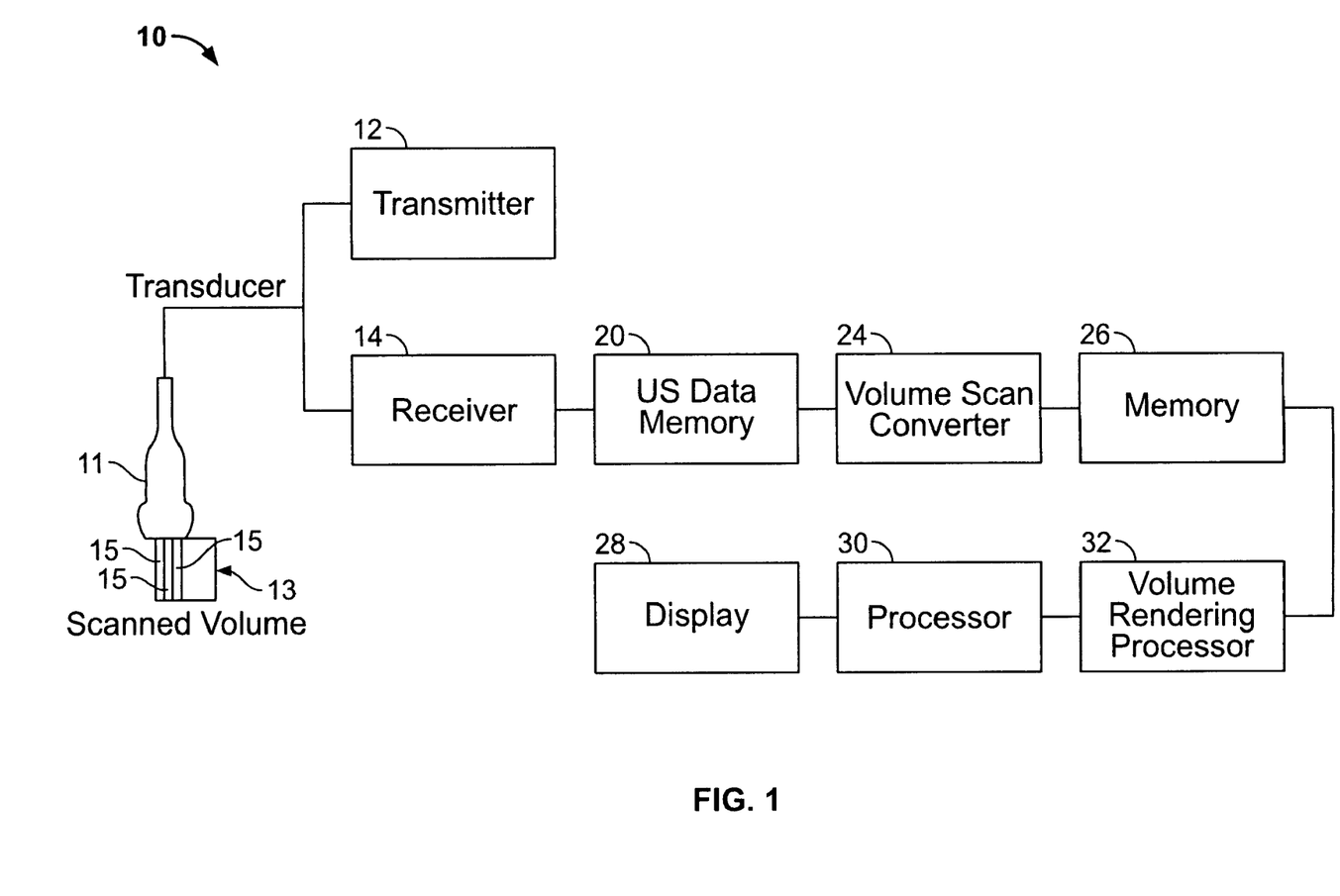
FIG. 1 illustrates a block diagram of an ultrasound system formed in accordance with one embodiment of the present invention.

FIG. 1 illustrates an ultrasound system 10 formed in accordance with one embodiment of the present invention. The system 10 includes a probe 11 connected to a transmitter 12 and a receiver 14. The probe 11 transmits ultrasonic pulses and receives echoes from structures inside of a scanned ultrasound volume 13. Memory 20 stores ultrasound data from the receiver 14 derived from the scanned ultrasound volume 13. The volume 13 may be obtained by various techniques (e.g., 3D scanning, real-time 3D scanning, 2D scanning with transducers having positioning sensors, freehand scanning using a voxel correlation technique, 1.25D, 1.5D, 1.75D, 2D or matrix array transducers and the like).

The probe 11 is moved, such as along a linear or arcuate path, or electronically steered when using a 2D array, while scanning a region of interest (ROI). At each linear or arcuate position, the probe 11 obtains scan planes 15. The scan planes 15 are stored in the memory 20, and then passed to a volume scan converter 24. In some embodiments, the probe 11 may obtain lines instead of the scan planes 15, and the memory 20 may store individual or subsets of lines obtained by the probe 11 rather than the scan planes 15. The memory 20 may store lines obtained by the probe 11 rather than the scan planes 15. The volume scan converter 24 creates data slices from the US data memory 20. The data slices are stored in slice memory 26 and are accessed by a volume rendering processor 32. The volume rendering processor 32 performs volume rendering upon the data slices. The output of the volume rendering processor 32 is passed to the processor 30 and display 28.

Figure 2:
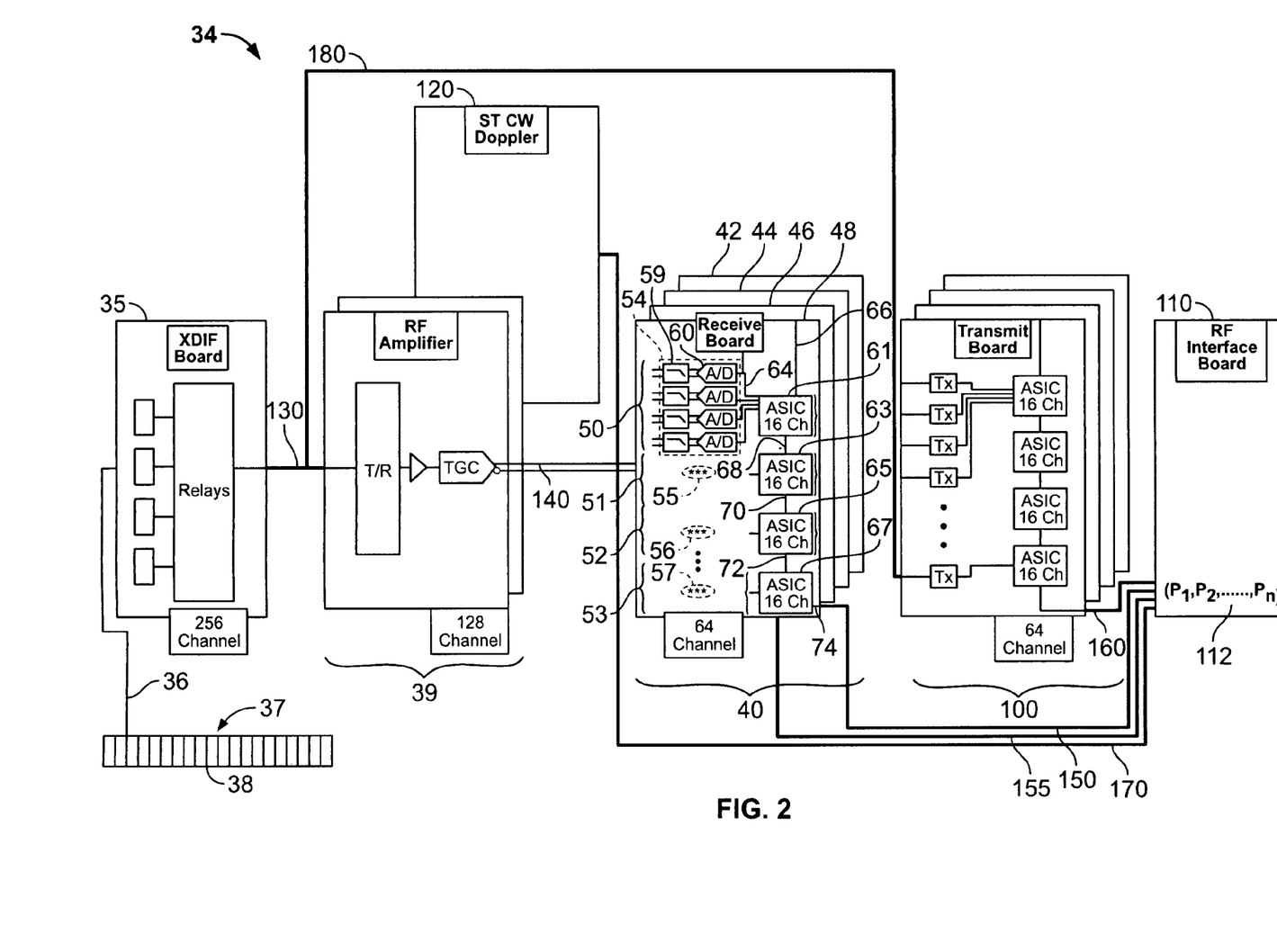
FIG. 2 is a block diagram of a front end for an ultrasound system formed in accordance with an embodiment of the present invention.

FIG. 2 is a schematic block diagram of a scalable ultrasound system front end 34 formed in accordance with an embodiment of the present invention. The ultrasound system front end 34 includes a transducer array 37 having transducer elements 38, transducer interface board 35, preamplifier boards 39, and receive boards group 40. Each of the receive boards are identified as receive board 42, receive board 44, receive board 46, and receive board 48. The ultrasound system front end 34 also includes transmit boards group 100, Radio Frequency Interface (RFI) board 110, and Doppler board 120. The receive boards group 40, the transmit boards group 100, and the RFI board 110 form the beamformer (BF).

Each of the receive boards in the receive boards group 40, shown in FIG. 2 as receive board 42, receive board 44, receive board 46, and receive board 48, has a similar scalable architecture, and thus only one receive board is described in detail, e.g. receive board 48. Receive board 48 is comprised of a plurality of Application Specific Integrated Circuit (ASIC) component groups, namely ASIC group 50, ASIC group 51, ASIC group 52, and ASIC group 53. Each of the ASIC component groups has a similar architecture, and thus only one ASIC group needs to be described in detail, e.g ASIC group 50. ASIC group 50 has an A/D converter group 54 and an ASIC 61, the A/D converter group 54 providing inputs 64 to ASIC 61. ASIC 61 has a repeater function capability which enables the ASIC 61 to supply the inputs 64 of the A/D converter group 54 to another ASIC residing on a receive board (not shown in FIG. 2).

The flow of information and processing in FIG. 2 is described as follows. The RFI board 110 receives commands from a control processor (not shown in FIG. 2) regarding the formation of an ultrasound pulse to be emitted into a region of interest. The RFI board 110 creates transmit parameters from the received commands that determine a transmit beam of a certain shape and from a certain point or points at the surface of the transducer array 37. The transmit parameters are sent over connection 160 from the RFI board 110 to the transmit boards group 100. The transmit boards group 100 generates transmit signals from the received transmit parameters. The transmit signals are set at certain levels and are phased with respect to each other to steer and focus the transmit signals into one or more transmit pulses or firings.

The transmit boards group 100 sends the transmit signals over connection 180 through the transducer interface board 35 to drive a plurality of transducer elements 38 within a transducer array 37. The connection 180 contains a number of individual channels or lines that may equal the number of transducer elements 38. The transmit signals excite the transducer elements 38 to emit ultrasound pulses. The ultrasound pulses are phased to form a focused beam along a desired scan line. Ultrasound echoes, which are backscattered ultrasound waves from tissue and blood samples within the scanned structure, arrive at the transducer elements 38 at different times depending on the distance into the tissue, from which they return and the angle, at which they contact the surface of the transducer array 37. The transducer array 37 is a two-way transducer and converts the backscattered waves (ultrasound echoes) of energy into received signals.

The received signals are conveyed in separate channels from the transducer array 37 over connection 36 to the transducer interface board 35, which relays the received signals over connection 130 to the preamplifier boards 39. The preamplifier boards 39 perform time gain compensation (TGC), a.k.a. swept gain, to increase the amplitude of received signals from increasing depths in the body to compensate for the progressive attenuation of the deeper echoes. The amplified received signals from the preamplifier boards 39 are passed over connection 140 to the receive boards group 40. In the illustrated example, connections 36, 130, and 140, each include 256 channels and the channels in the connection 140 are divided into four groups of 64 channels. Each of the receive boards in the receive boards group 40, e.g. receive board 48, receives a group of 64 channels from the preamplifier boards 39.

The receive board 48 receives 64 channels that are divided into four groups of 16 channels, each group supplying input to an ASIC group, e.g. ASIC group 50, ASIC group 51, ASIC group 52, and ASIC group 53. Each channel is formed as a low voltage differential pair which is joined to a corresponding filter and A/D converter, e.g. filter 59 and A/D converter 60. Each filter 59 filters the corresponding signal and each A/D converter 60 converts the filtered signal to a digital signal. Under the guidance of control instructions received from the control processor via the RFI board 110 (control processor and control signaling lines of control processor not shown in FIG. 2), the filtered, digitized input signals (e.g. inputs 64) are processed by an ASIC (e.g. ASIC 61). The processing may include performing time delaying and summation of processed received signals, potentially with summation of prior beam data (e.g. the beam data from bus 66), so as to construct a received beam from the echoes reflected from a given point within the subject's body. The beam data from an ASIC is passed along to a next entity, e.g. from ASIC 61 to the next ASIC 63 on the same receive board 48 or from an ASIC to an ASIC on the next receive board in the FIG. 2 receive boards group 40.

FIG. 2 shows four receive boards, 42, 44, 46, and 48, that are inter-connected such that beam data flows serially from receive board 42 to receive board 44 to receive board 46 to receive board 48. FIG. 2 shows that receive board 48 includes ASICs 61, 63, 65, 67 joined serially with one another, such as in a column direction. Each ASIC 61, 63, 65, and 67 receives 16 digitized receive signal inputs, e.g. inputs 64, from 4 A/D converters, e.g. A/D converter group 54. The received signals at ASIC 61 are processed and summed with one another and potentially also summed with beam data arriving on bus 66 from a previous receive board 46. The resulting beam data is placed on bus 68. Bus 68 conveys the beam data, hereon also referred to as simply data, to ASIC 63. The beam data received on bus 68 by ASIC 63 may simply be passed, without further processing, onto bus 70 depending upon the source of the beam data. Each of ASICs 61, 63, 65 and 67 analyze incoming beam data connected on buses 66, 68, 70 and 72, respectively, to determine source identifying information. Depending upon the source of the beam data, the beam data received on bus 68 by ASIC 63 will be further processed by ASIC 63 in connection with received signals provided directly to the ASIC 63 from A/D converter group 55. The ASIC 63 will then place the resulting data on bus 70 which is passed to ASIC 65. The ASIC 65 will either pass data incoming on bus 70 directly to bus 72 without further processing or process the data in connection with received signals provided directly to the ASIC 65 by A/D converter group 56. The AISC 67 will either pass data incoming on bus 72 directly to bus 74 without further processing or process the data in connection with received signals provided directly to the ASIC 67 by A/D converter group 57. The beam data on bus 74 is then either passed to a next receive board of the receive boards group 40 or to high speed serial data bus (HSSDB) 150.

In FIG. 2, processed beam data is passed from receive board 42 to receive board 44, and then from receive board 44 to receive board 46, and then from receive board 46 to receive board 48. Receive board 48 delivers the resulting fully formed beam data sets for one or more completely constructed beams to the RFI board 110 via HSSDB 150.

More than one beam may be constructed simultaneously at the receive boards group 40 of FIG. 2. The simultaneous collecting and processing of echo information along multiple scan lines within the subject is referred to as multi-line acquisition (MLA). The one or more fully formed beam data sets are passed from the receive boards group 40 over the high speed serial data bus (HSSDB) 150 to the RFI board 110.

Although FIG. 2 shows the RFI board 110 being connected to the Doppler board 120 via connection 170, various functions allocated to the Doppler board 120 may be allocated instead to the RFI board 110, and vice versa. The beam data sets received over the HSSDB 150 are demodulated at the RFI board 110 to create I/Q pairs of demodulated data values. The demodulated data is transferred to Doppler board 120 via connection 170 for processing through standard techniques, such as discrete Fourier transform (DFT) processing, to generate a set of spectral Doppler data corresponding to the signals received from a scanned point. The set of spectral Doppler data is processed by scan conversion to perform a translation from scan sequence format (spectral lines of Doppler frequency data) to display format (spectral display pixel data in the time versus frequency display format). The scan converted pixel data is then sent to display component architecture (not shown in FIG. 2) to convert the digital pixel data to analog data for display on a monitor.

The ultrasound system front end 34 has a scalable architecture in that the ultrasound system front end 34 may be expanded or upgraded on demand by adding ASICs to existing receive boards and/or adding receive boards. The ASICs and receive boards already in the ultrasound system front end 34 do not require a re-design in order to expand or reduce the system and/or its capacity. Each receive board of the receive boards group 40 is comprised of substantially similar circuitry and components and layouts such that each receive board can be easily expanded or scaled upwards in capacity by adding similar components. An expanded board will still work properly with other system components or boards without requiring re-design, the components or boards being similarly scaled upwards as required by adding similar component modules. One possible scalable configuration is exhibited by the configuration of receive board 48 in FIG. 2.

In this configuration, each of the receive boards, 42, 44, 46, and 48, of the receive boards group 40 handles a common number of channels, in this example 64 channels per board. A channel supplies a single receive signal corresponding to one of the transducer elements 38 of the transducer array 37. Any number of receive boards similar to receive board 48 may be joined in a daisy chain or serial ring arrangement depending upon the number of channels to support. For example, two receive boards may be used to process 128 channels, or eight received boards may be used to process 512 channels, and the like.

Figure 3:
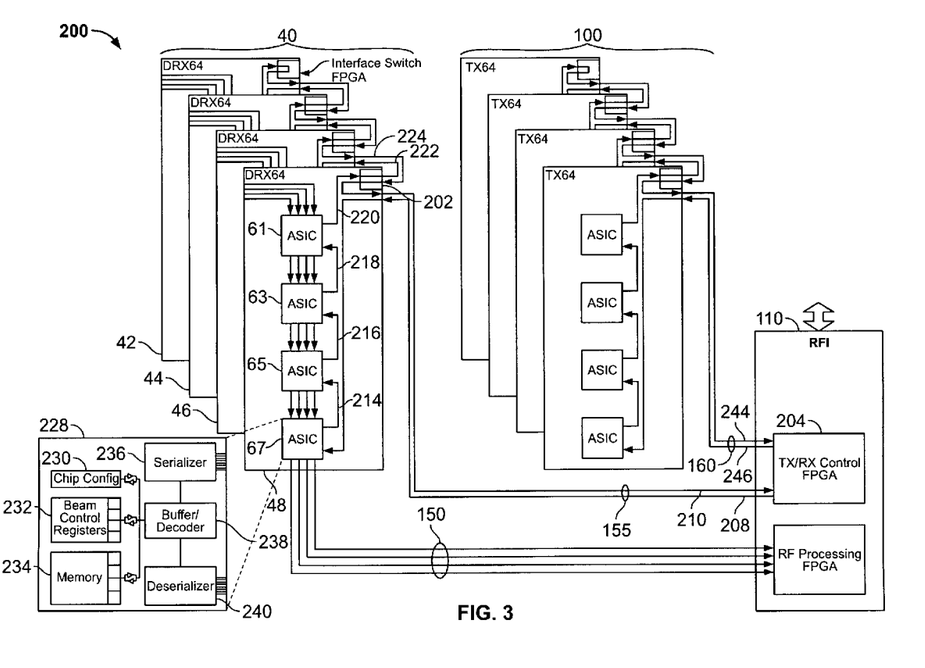
FIG. 3 is a block diagram of a portion of the front end of FIG. 1.

FIG. 3 is a block diagram of a portion of the front end of FIG. 2. Shown in FIG. 3 are the receiver boards group 40, the transmit boards group 100, the RFI board 110, and an expanded ASIC view 228. The connectivity and functionality related to processing transducer element signals into beam data at the receive boards group 40 and thereafter conveying the beam data to the RFI board 110 over the high speed serial data bus (HSSDB) 150 has been discussed. The following describes connectivity and functionality of the high speed serial control buses (HSSCBs), e.g. receive boards HSSCB (RCV HSSCB) 155 and transmit boards HSSCB (XMIT HSSCB) 160.

RCV HSSCB 155 connects control FPGA 204 of the RFI board 110 to the receive boards group 40. XMIT HSSCB 160 connects the control FPGA 204 to the transmit boards group 100. Control information is conveyed in the form of packets of a packetized protocol to the receive boards group 40 from control FPGA 204 over control pipe 208 and received back from receive boards group 40 over control pipe 210 to control FPGA 204. Control pipes 208 and 210 form the RCV HSSCB 155 in a ring or daisy-chain topology. As the example of FIG. 3 shows, control information flows over control pipe 208 into receive board 48 and into ASIC 67. From ASIC 67 control information flows over control pipe 214 into ASIC 65, from ASIC 65 over control pipe 216 to ASIC 63, from ASIC 63 over control pipe 218 to ASIC 61, and from ASIC 61 over control pipe 220 to FPGA interface 202. From FPGA interface 202 control information flows over control pipe 222 from receive board 48 to receive board 46. Control pipes 214, 216, 218, 220, and 222 form a set of component-to-component buses to interconnect board components and boards for the conveyance of control information. In a similar fashion to the flow of control information through the ASICs of the receive board 48, the control information flows through the ASICs of receive board 46 to an FPGA interface of receive board 46, similar to the FPGA interface 202 of the receive board 48.

From the FPGA interface of the receive board 46, the control information flows into receive board 44. In a similar fashion to the flow of control information in receive boards 48 and 46, the control information flows through the components of receive boards 44 and 42. From receive board 42, the control information flows through the FPGA interfaces of receive boards 44, 46, and 48 to the control pipe 210 to be returned to the control FPGA 204 of RFI board 110. Control information is returned from receive board to receive board as is done from receive board 46 to receive board 48. Control information flows from receive board 46 over control pipe 224 to FPGA interface 202 on receive board 48, into receive board 48, and back out of receive board 48. In the case of receive boards 42, 44, and 46, the control information flows back out to a next receive board, e.g. from receive board 42 to receive board 44, and from receive board 44 to receive board 46, and from receive board 46 to receive board 48. In the case of receive board 48, the control information flows back out to control pipe 210. In this fashion a ring or daisy-chain is formed with the control pipes 208 and 210 along with the control pipes of the receive boards of the receive boards group 40. Translating this process, control information flows out of control FPGA 204 of RFI board 110 onto a ring, whereby control information flows over the RCV HSSCB 155 to the receive boards group 40, through the control pipes of the receive boards of receive boards group 40, and back onto the RCV HSSCB 155 to be returned to control FPGA 204.

Figure 4:
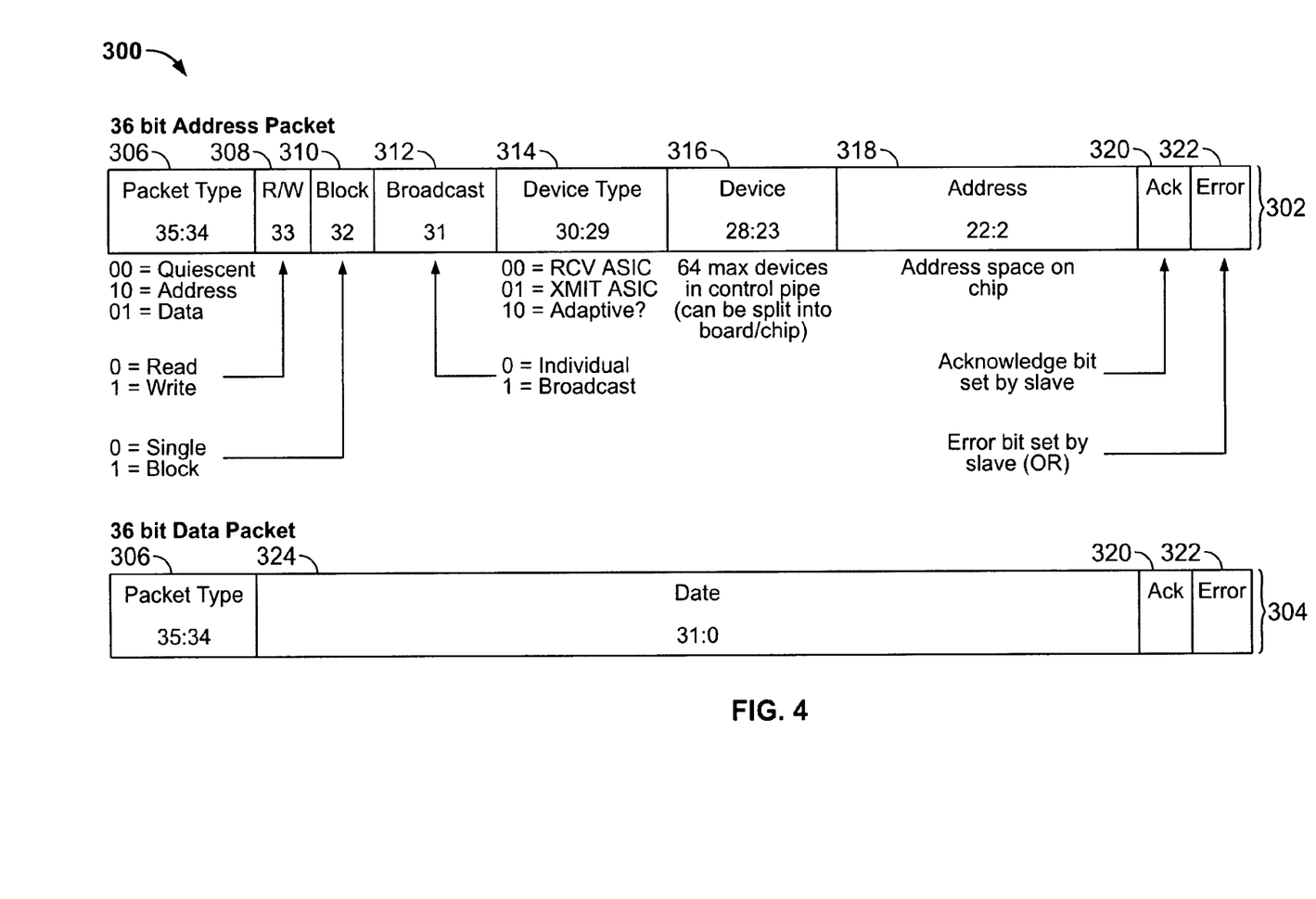
FIG. 4 is a diagram exemplifying a packetized protocol for use with a beamformer high speed serial control bus (HSSCB) in accordance with an embodiment of the present invention.

The expanded ASIC view 228 of FIG. 3 shows the interconnected components of an ASIC, e.g. chip configuration 230, beam control registers 232, memory 234, serializer 236, buffer/decoder 238, and deserializer 240. The deserializer 240 accepts serial input from a control pipe and generates parallel output to the buffer/decoder 238. The buffer/decoder 238 may perform reads/writes to memory 234 and reads/writes to registers 232. Whether a read or write is done is determined by the setting of a R/W field 308 of an address packet 302 as shown in FIG. 4. The control information is passed in the form of parallel input from the buffer/decoder 238 to serializer 236. Serializer 236 transmits the control information received as parallel input as serial output onto a control pipe. Chip configuration 230 may perform ASIC processing and beamformer operations with the data found in beam control registers 232 and memory 234. Chip configuration 230 may also include a unique ID identifying the ASIC device address.

The flow of control information over XMIT HSSCB 160 from control FPGA 204 to transmit boards group 100 and back over XMIT HSSCB 160 to control FPGA 204 occurs in a similar fashion to that described above for RCV HSSCB 155. Control information flows out of control FPGA 204 of RFI board 110 onto control pipe 246 of XMIT HSSCB 160 to the transmit boards group 100, through the control pipes and components of the transmit boards of transmit boards group 100, and back onto control pipe 244 of XMIT HSSCB 160 to be returned to control FPGA 204. The operation of XMIT HSSCB 160 is similar to that of RCV HSSCB 155. The same packetized protocol is used for forming packets of control information that are conveyed over XMIT HSSCB 160 and RCV HSSCB 155.

RCV HSSCB 155 and XMIT HSSCB 160 convey control information in the form of packets formatted in accordance with a packetized protocol as described in more detail herein. Control FPGA 204 transmits control information, e.g. the global parameters 112 of FIG. 2, to the ASICs of the transmit boards group 100 via XMIT HSSCB 160. The ASICs of the transmit boards group 100 process the received control information and use the processed information to generate output signals that are transmitted to the transducer array 37 via the connections 180, 130 and 36, as shown in FIG. 2. Transducer array 37 uses the received output signals to fire the transducer elements 38 for the next ultrasound pulse.

Control FPGA 204 transmits control information, e.g. the global parameters 112, to the ASICs of the receive boards group 40 via RCV HSSCB 155. The ASICs of the receive boards group 40 process the received control information to generate delay control values which the ASICs store and use to generate beam data from input signals from the transducer elements 38 as a result of the firing of an ultrasound pulse. Once configured, the transducer elements 38 may fire an ultrasound pulse into a region of interest of a subject. When receiving the back-scattered echoes from the region of interest of the subject as a result of the firing of the ultrasound pulse, transducer elements 38 generate input signals from the received echoes, the input signals are transmitted to the receive boards group 40 via connections 36, 130 and 140. The ASICs of the receive boards group 40 process the received input signals into beam data using the processed control information, e.g. the delay control values. The ASICs of the receive boards group 40 receive control information from RFI board 110 and process the control information into delay control values within the time interval between ultrasound pulse firings. For each ultrasound pulse firing, the ASICs of the receive boards group 40 may have generated a set of delay control values from control information received from RFI board 110 different from the set of delay control values used in a previous ultrasound firing. The transmission rate over the HSSCBs allows for rapid setup of control information within the receive boards group 40 and transmit boards group 100 so as to maintain the firing rate (framing rate) when scaling the beamformer MLA number upwards, e.g. from MLA4 to MLA16. In one embodiment, the transmission rate of control information over the HSSCBs is equal to or greater than 400 Mbps. In yet another embodiment, the transmission rate is equal to or greater than 1.0 Gbps (gigabits per second), and in yet another embodiment, equal to or greater than 2.0 Gbps.

Control information may initially be received by the RFI board 110 from an ultrasound control processor (not shown in FIG. 2). Optionally, either the ultrasound control processor or the RFI board 110 may perform calculations on the control information, e.g. the global parameters 112, to obtain delay control values, and transmit the delay control values to the transmit boards group 100 and the receive boards group 40. Alternatively, the RFI board 110 may broadcast the global parameters 112, as compared to processing the global parameters 112 to obtain delay control values, over RCV HSSCB 155 and XMIT HSSCB 160 to the ASICs of the receive boards group 40 and the ASICs of the transmit boards group 100, correspondingly. The ASICs then process the global parameters 112 into delay control values. By transmitting the global parameters 112 over RCV HSSCB 155 and XMIT HSSCB 160 as compared to transmitting the much larger set of delay control values which may be generated from the global parameters 112, a reduced amount of control information may be transmitted over RCV HSSCB 155 and XMIT HSSCB 160. Transmitting a lesser amount of control information in the form of global parameters 112 over RCV HSSCB 155 and XMIT HSSCB 160, and allowing the ASICs to generate the delay control values, may result in more time for generating beam data. Allowing the ASICs to generate the delay control values, as compared to transmitting the delay control values to the ASICs, results in less time being needed between ultrasound pulses for setup of control information in the ASICs. As a result, more time may be available for the processing of input signals into beam data. With the ability to scale upwards the MLA number for a scalable beamformer, e.g. from MLA4 to MLA16, a greater amount of time may be needed for processing input signals into beam data between ultrasound pulses.

Examples of the global parameters 112 are the coordinates within a coordinate space, such as the starting focus point and the ending focus point, and the rate at which the focus point changes along the MLA line or focus trajectory. Examples of delay control values are the initial delay, the start delay, the delay rate of change, and the different delay inflection points. All the delay control values are at the transducer element level in that the delay control values would have to be calculated and passed down from RFI board 110 to the ASICs for every transducer element and receive channel, if not being computed by the ASICs based on the received global parameters 112.

FIG. 4 is a diagram exemplifying a packetized protocol 300 for use with a beamformer high speed serial control bus (HSSCB), e.g. RCV HSSCB 155 and XMIT HSSCB 160, in accordance with an embodiment of the present invention. The packetized protocol 300 includes packets of distinct packet types or formats, e.g. address packet 302 and data packet 304. Packet type field 306 of each packet is set to a value designating the packet type, e.g. a "00" may designate a quiescent packet type, a "01" may designate a data packet type, and a "10" may designate an address packet type. A quiescent packet type is a dummy packet (has no real information) that is sent when a framing clock indicates time to send a packet and yet there is no control information available and ready to send. To designate an address packet, the packet type field 306 of the packet is set to "10".

The fields included in this packet are the packet type field 306, R/W field 308, block field 310, broadcast field 312, device type field 314, device field 316, address field 318, acknowledgement field 320 and error field 322. The device type field 314 contains a value designating the type of processing component, e.g. "00" may indicate an RCV ASIC located on one of the boards of the receive boards group 40, "01" may indicate an XMIT ASIC located on one of the boards of the transmit boards group 100, "10" may indicate application specific processing done by another device type (not receive or transmit). The broadcast field 312 is a boolean value indicating either a broadcast to all processing components or not. For example, if set, the broadcast field 312 indicates broadcast, and the transmitted information is destined for all processing components connected to the HSSCB. In the broadcast case, the device field 316 value is ignored by the processing components receiving the packetized control information. Alternatively, if the broadcast field 312 is reset, broadcast is not indicated, and each of the processing components receiving the transmitted control information take note of the value of device field 316.

If the value in the device field 316 matches an ID for one of the processing components, e.g. a chip identification ID located in chip configuration 230 of FIG. 3, then the matching component is the destination for the transmitted information. Each of the processing components in the beamformer may have a unique identifier or ID. The address field 318 is set to a memory address value associated with one of the processing components. (Alternatively, the memory address value may be associated with more than one of the processing components if the packet is a broadcast packet). For example, the address value may be a register address in beam control registers 232 or a memory address in memory 234 of FIG. 3. In broadcast mode, the address may be a place to read information from or write the control information to for more than one processing component. Alternatively, for non-broadcast mode, the device field 316 designates a processing component and the address 318 designates a storage location within the processing component for reading information from or writing information into.

As an example of the operation of the packetized protocol 300, when receiving an address packet 302 that designates non-broadcast mode in broadcast field 312, one of the processing components, e.g. ASIC 67 on receiver board 48, matches the ASIC ID, which may be stored in chip configuration 230, to the value in device field 316. With a match, the ASIC 67 knows the control information being transmitted is for ASIC 67. The address field 318 in address packet 302 may be a location in the ASIC 67 memory for a delay control value, e.g. start delay. If the R/W field 308 of address packet 302 is set to W, designating a "write" operation, ASIC 67 writes control information, e.g. the start delay, into memory, e.g. memory 234, using the location designated by the address value in the address field 318.

Sequentially following address packet 302 will be one or more data packets 304. The data field 324 of data packet 304 contains one packet worth of control information, e.g. a start delay value. When receiving data packet 304, ASIC 67 may store the data from data field 324 into memory 234 using the location with the address value as designated in the address field 318. In this way, control information relating to beamforming operations is conveyed to the processing components of the beamformer. Block field 310 of address packet 302 designates whether one or more than one data packet 304 is to be received sequentially after address packet 302 in order to provide the control information, e.g. start delay. Assuming the start delay value can fit into one data packet 304, the block field 310 in address packet 302 is reset, indicating the control information transmitted to ASIC 67 is packetized into one data packet 304. Alternatively, setting the block field 310 indicates more than one data packet 304 is populated for packetizing the control information to be received by ASIC 67. In this case, multiple data packets 304 follow the address packet 302 and are received by ASIC 67. As an example, assume the start delay value requires four data packets 304. ASIC 67 receives and matches on an address packet 302 and processes all following data packets 304 until receiving a next address packet 302. ASIC 67 receives four (four in this example being a random choice) data packets 304 containing the start delay value and stores the data field 324 for all four data packets 304 into memory 234 starting at the address location designated by the address value in address field 318 of address packet 302.

When a packet is received by a processing component to which it is addressed, the processing component sets the acknowledgement field 320. The packet is returned to the sender, e.g. control FPGA 204 of RFI board 110, with the acknowledgement field 320 set to indicate the packet was received by the addressee. In addition to the acknowledgement field 320, an error field 322 is formatted within the address packet 302 and may be set by the associated processing component to which the packet is addressed. For example, the address provided in the address field 318 may not be a valid address for the processing component. When the control FPGA 204 of the RFI board 110 receives a packet back with the error field 322 set, the control FPGA 204 is informed that the addressed processing component for the packet was unable to process the packet information.

Alternatively to writing the control information into a processing component, e.g. ASIC 67, the R/W field 308 may be set to indicate a read operation. For example, the RFI board 110 may need to read the operational status of the ASICs or the ASIC boards. When receiving the data packet 304, information is read from a memory address of the processing component, the memory address designated by the value contained in the address field 318, into the data field 324 of data packet 304, and is returned to the sender of the packet, e.g. control FPGA 204. Depending on how the R/W field 308 is valued, information will either be written into memory of the addressed processor component or copied from memory of the addressed processor component from/to, correspondingly, the packet to be returned to the RFI board 110.

The addressing of a processing component by use of the device field 316, which carries the device identification or ID, can be done at a chip level, e.g. an ASIC, or at a board level, e.g. receive board 48. For example, in addressing the receive board 48, the control information may be destined for use by all the ASIC components residing on receive board 48. In this way, subsets of components may all be addressed as well as a given component. With a unique ID assigned, the addressed processing component may be at the smallest unit level, e.g. an ASIC, or may be at an intermediate unit level, e.g. an ASIC receive board, whereby all units included in the intermediate level unit are addressed.

Figure 5:
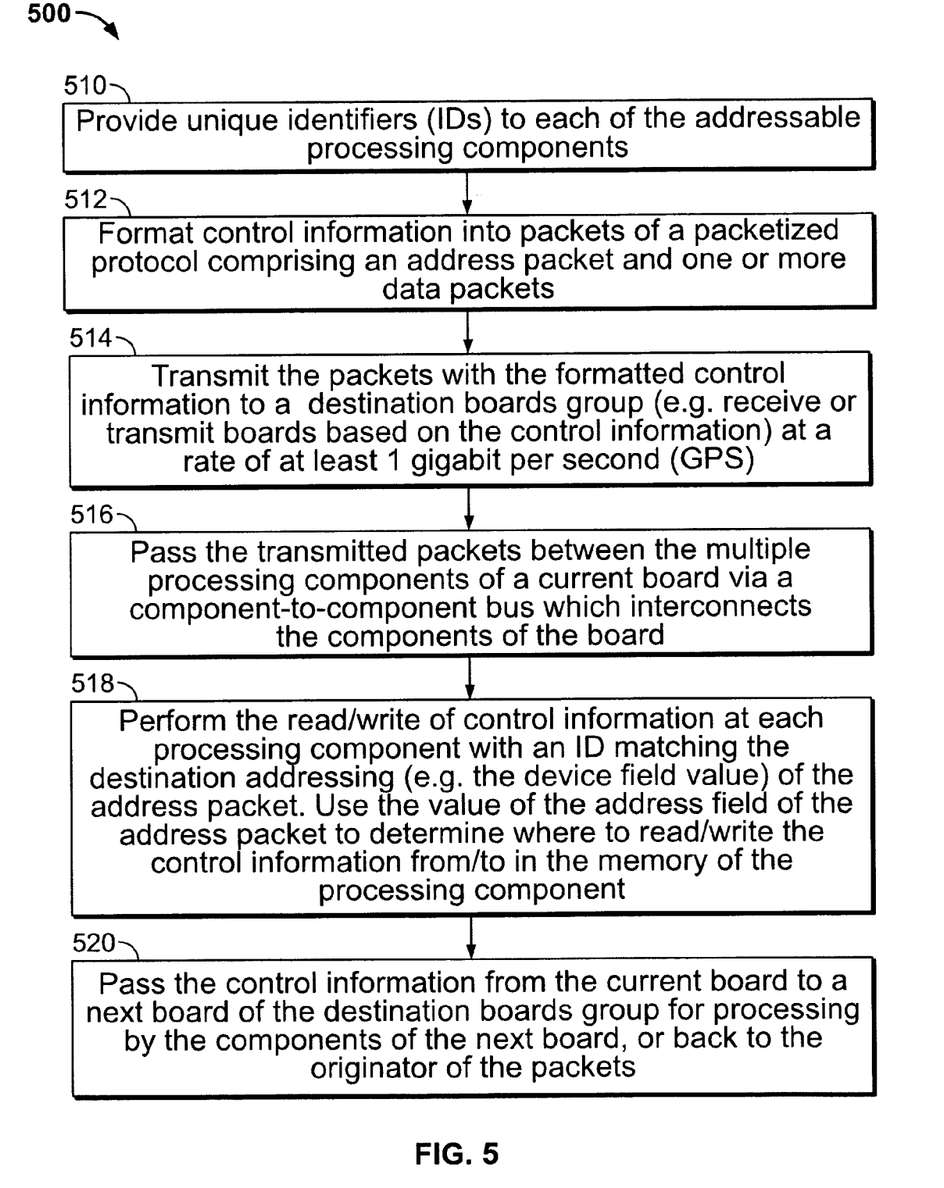
FIG. 5 is a diagram of a method for formatting and transmitting control information in accordance with an embodiment of the present invention.

FIG. 5 is a diagram of a method 500 for formatting and transmitting control information as packets in accordance with an embodiment of the present invention. Six steps are illustrated in method 500.

Step 510 assigns to each processing component of the destination boards (e.g. the receive boards of receive boards group 40 or the transmit boards of transmit boards group 100 of FIG. 3) a unique address or component identifier (ID). A board of the destination boards group may have a unique ID assigned as well which permits addressing of all the components on the board by specifying the board ID as the component ID in the destination address of the packets.

Each processing component may have a unique ID assigned dynamically during power-up. A command packet with an initial value is transmitted to the processing components. Each of the processing components saves the value received in the command packet as a unique ID. When transmitting the command packet to a next processing component, a processing component modifies the value in the command packet that is transmitted to the next processing component. Each of the processing components obtains a unique ID from the modified value.

Step 512 is performed by the originator, e.g. the RFI board 110 of FIG. 3. Step 512 divides the control information to be transmitted into packets and formats the packets according to a packetized protocol. The packets created and formatted with the control information may be comprised of an address packet and one or more data packets as illustrated and discussed for the example packetized protocol 300 of FIG. 4.

In step 514 the formatted packets are transmitted to a group of destination boards, e.g. to the receive boards group 40 or the transmit boards group 100 of FIG. 3. The formatted packets are transmitted at a rate of at least 400 Mbps over a high speed serial control bus (HSSCB), e.g. the RCV HSSCB 155 for transmission to the receive boards group 40 or the XMIT HSSCB 160 for transmission to the transmit boards group 100 (FIG. 3). When received at the first of the group of destination boards, the formatted packets are passed between the plurality of processing components of the board via a component-to-component bus. The formatted packets contain information determining the processing component/device and address within the memory of the component to which the control information is read from or written to. (For the formatting of control information into packet fields, refer to the packet formats of FIG. 4.) For example, the address packet 302 may have the R/W field 308 set to "write", the block field 310 set to "block", the broadcast field 312 set to "individual", the device type field 314 set to "RCV ASIC", the device field 316 set to an ID that matches the unique ID of ASIC 67 of receive board 48 (FIG. 3), and the address field 318 set to an address value which is within the addressable memory range of memory 234 (FIG. 3). The address may specify the beginning location for a block of memory for a beamformer parameter. In this case, more than one data packet 304 is received by ASIC 67 as indicated by block field 310 set to "block". Starting at the memory location specified in address field 318, the ASIC 67 writes into the memory 234 the beamformer parameter control information found in the data packets 304. Due to the broadcast field 312 set to "individual", only the processing components with an ID matching the ID found in the device field 316 perform the write operation. Alternatively, the broadcast field 312 may be set to "broadcast". In this case, the value in the device field 316 is ignored by all the processing components, and all processing components on the bus process the received packets.

Step 516 passes the transmitted packets between the multiple processing components of a board. As the packets are received by a processing component, the component checks the packet addressing against the component ID to determine a match. If matching, the processing component performs with the control information received the operation (read/write) as specified in the received packets.

Step 518 performs the read/write operation at a matching processing component. Control information may be written into the memory of the processing component from the received packets, or control information may be read from the memory of the processing component and placed into the received packets for return to the originator of the packets. The processing component may set the acknowledgement field 320 and the error field 322 (FIG. 4) to specify whether the control information was correctly received and processed. The originator of the packets receives the packets back after the packets are processed at the destination boards due to the configuring of the HSSCB for transmission of the packets as a ring/daisy-chain.

Step 520 continues the process of passing the transmitted packets to the processing components of the rest of the destination boards and finally back to the originator of the packets. Once received back by the originator, e.g. RFI board 110 of FIG. 3, the originator may check the acknowledgement field 320 and error field 322 (FIG. 4) to verify that the packets were properly received and processed at the destination boards.

While the invention has been described in terms of various specific embodiments, those skilled in the art will recognize that the invention can be practiced with modification within the spirit and scope of the claims.

What is claimed is:

1. A method for conveying control information in an ultrasound system having a beamformer and separate circuit boards each having processing components, said method comprising:
   providing a dynamic addressing of the processing components by transmitting a command packet with an initial value to the processing components, the initial value being used to create a unique identifier for the processing component that receives the command packet, the initial value being modified by at least one of the processing components prior to transmitting the command packet to another one of the processing components;
   formatting control information into at least one packet based on a packetized protocol, said control information directing at least one of the processing components to perform a beamforming operation, the control information including a component identification of the at least one of the processing components; and conveying the control information to the at least one of the processing components based on a comparison of the component identification in the control information and the unique identifiers of the processing components, the control information conveyed by serially communicating the control information among the circuit boards.

2. The method of claim 1, wherein said conveying includes serially transmitting said control information among multiple processing components interconnected by a component-to-component bus of each circuit board.

3. The method of claim 1, wherein said formatting includes formatting said control information into distinct address and data packet formats.

4. The method of claim 1, wherein said formatting includes formatting an address field containing an address into memory associated with one of the processing components, said address being correlated to at least one beamforming parameter.

5. The method of claim 1, further comprising conveying the at least one packet from the processing components, wherein the at least one packet includes an acknowledgement field set to indicate receipt by an associated one of the processing components and an error field set to indicate a failed transaction by an associated one of the processing components.

6. The method of claim 1, further comprising performing, by each of the at least one of the processing components, one of a transmit and receive beamformer operation based on said control information.

7. The method of claim 1, further comprising providing the unique identifiers for the processing components, wherein said conveying comprises serially conveying the control information from a control processor in the ultrasound system among the processing components and the circuit boards and returning the control information to the control processor, the processing components with unique identifiers that are a mismatch with the component identification passing the control information to one or more other processing components without performing the beamforming operation.

8. A beamformer for an ultrasound system, said beamformer comprising:
    transmit beamformer circuit boards each including a deserializer and a serializer;
    receive beamformer circuit boards each including a deserializer and a serializer; and
    a control processor formatting control information to direct beamforming operations performed by one or more of the transmit beamformer circuit boards and the receive beamformer circuit boards, the deserializers in the transmit beamformer circuit boards and the receive beamformer circuit boards receiving the control information as a serial input and communicating the control information to the corresponding serializers in the transmit beamformer circuit boards and in the receive beamformer circuit boards as a parallel output.

9. The beamformer of claim 8, wherein the serializers in the transmit beamformer circuit boards convey the control information to the deserializer of a different transmit beamformer circuit board as a serial output.

10. The beamformer of claim 8, wherein the serializers in the receive beamformer circuit boards convey the control information to the deserializer of a different receive beamformer circuit board as a serial output.

* * * * *

UNITED STATES PATENT AND TRADEMARK OFFICE
CERTIFICATE OF CORRECTION

PATENT NO. : 7,611,463 B2  Page 1 of 1
APPLICATION NO. : 10/975579
DATED : November 3, 2009
INVENTOR(S) : Snehal Chandrakant Shah It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 668 days.

Signed and Sealed this

Twelfth Day of October, 2010

David J. Kappos
*Director of the United States Patent and Trademark Office*